United States Patent
Wang

(10) Patent No.: US 11,472,941 B2
(45) Date of Patent: Oct. 18, 2022

(54) FUNCTIONAL MONOMER COMPRISING RARE EARTH/METAL COMPOUND, PREPARATION METHOD THEREOF, AND METHOD OF USING THE SAME

(71) Applicant: SHANGHAI LUFENG AUXILIARY CO., LTD., Shanghai (CN)

(72) Inventor: Feng Wang, Shanghai (CN)

(73) Assignee: SHANGHAI LUFENG AUXILIARY CO., LTD., Shanghai (CN)

( * ) Notice: Subject to any disclaimer, the term of this patent is extended or adjusted under 35 U.S.C. 154(b) by 239 days.

(21) Appl. No.: 16/845,039

(22) Filed: Apr. 9, 2020

(65) Prior Publication Data

US 2020/0231777 A1   Jul. 23, 2020

Related U.S. Application Data

(63) Continuation-in-part of application No. PCT/CN2018/080192, filed on Mar. 23, 2018.

(30) Foreign Application Priority Data

Oct. 10, 2017 (CN) .......................... 201710935664.0
Oct. 10, 2017 (CN) .......................... 201710936339.6
Oct. 10, 2017 (CN) .......................... 201710936349.X

(51) Int. Cl.
| | | |
|---|---|---|
| C08K 3/22 | (2006.01) | |
| C08K 5/17 | (2006.01) | |
| C08K 5/101 | (2006.01) | |
| C08K 5/09 | (2006.01) | |
| C08F 20/44 | (2006.01) | |
| C08F 20/06 | (2006.01) | |
| C08F 30/02 | (2006.01) | |
| C08F 14/08 | (2006.01) | |
| C08F 2/26 | (2006.01) | |
| C08F 2/44 | (2006.01) | |

(52) U.S. Cl.
CPC .................. *C08K 3/22* (2013.01); *C08F 2/26* (2013.01); *C08F 2/44* (2013.01); *C08F 14/08* (2013.01); *C08F 20/06* (2013.01); *C08F 20/44* (2013.01); *C08F 30/02* (2013.01); *C08K 5/09* (2013.01); *C08K 5/101* (2013.01); *C08K 5/17* (2013.01); *C08K 2003/221* (2013.01)

(58) Field of Classification Search
CPC .... C08K 3/22; C08K 2003/221; C08K 5/101; C08K 5/09; C08K 5/17; C08F 20/44; C08F 20/06; C08F 30/02; C08F 14/08; C08F 2/26; C08F 2/44
See application file for complete search history.

(56) References Cited

U.S. PATENT DOCUMENTS

| | | | | |
|---|---|---|---|---|
| 5,922,519 | A * | 7/1999 | Ishikawa .................. | G03C 7/42 430/455 |
| 2005/0019301 | A1* | 1/2005 | Contet-Audonneau ..................... | A61P 17/16 424/70.14 |
| 2005/0032990 | A1 | 2/2005 | Watanabe et al. | |

FOREIGN PATENT DOCUMENTS

| | | |
|---|---|---|
| CN | 1966534 A | 5/2007 |
| CN | 1986583 A | 6/2007 |
| CN | 101514125 A | 8/2009 |
| CN | 101649015 A | 2/2010 |
| CN | 103193918 A | 7/2013 |
| CN | 103275262 A | 9/2013 |
| CN | 104028312 A | 9/2014 |
| CN | 104529759 A | 4/2015 |

OTHER PUBLICATIONS

Zhen Hu et al., (C8H15O2)x(C12H23O2)yEu/PMMA Luminescent Material, Chinese Journal of Applied Chemistry, Jun. 2009, pp. 646-650, vol. 26 No. 6, China Academic Journal Electronic Publishing House, China.

* cited by examiner

*Primary Examiner* — Robert D Harlan
(74) *Attorney, Agent, or Firm* — Matthias Scholl P.C.; Matthias Scholl

(57) ABSTRACT

A composition of matter including a mother solution; an organic ester; an additive agent and deionized water. The mother solution includes a rare earth compound or a metal compound, an organic acid, an organic amine, and deionized water. Also provided is a method of preparing the composition of matter. The method includes: 1) heating deionized water to a temperature of 50-60° C.; adding an organic acid to the deionized water, allowing to dissolve, followed by addition of a rare earth compound or a metal compound, 2-4 hours later, adding an organic amine, heating to a temperature of 70-80° C. and holding; cooling and filtering to yield a mother solution; 2) mixing the mother solution, deionized water, and a catalyst; vacuumizing a resulting mixture, heating the mixture to a temperature of 95-125° C. and holding, following by addition of a polymerization inhibitor and an organic ester; 2-4 hours later, cooling, standing, separating.

20 Claims, No Drawings

FUNCTIONAL MONOMER COMPRISING RARE EARTH/METAL COMPOUND, PREPARATION METHOD THEREOF, AND METHOD OF USING THE SAME

CROSS-REFERENCE TO RELATED APPLICATIONS

This application is a continuation-in-part of International Patent Application No. PCT/CN2018/080192 with an international filing date of Mar. 23, 2018, designating the United States, and further claims foreign priority benefits to Chinese Patent Application No. 201710936349.X filed Oct. 10, 2017, to Chinese Patent Application No. 201710935664.0 filed Oct. 10, 2017, and to Chinese Patent Application No. 201710936339.6 filed Oct. 10, 2017. The contents of all of the aforementioned applications, including any intervening amendments thereto, are incorporated herein by reference.

BACKGROUND

The disclosure relates to a functional monomer comprising a rare earth/metal compound and a preparation method and use thereof.

Polyvinylidene chloride (PVDC) tends to be decomposed at the temperature of 100-120° C. As a packaging material, when PVDC is heated or placed at room temperature, hydrogen chloride tends to be produced, which will lead to the failure of the barrier property of the packaging material.

SUMMARY

The disclosure provides a functional monomer comprising a rare earth/metal compound and its preparation method and application. The copolymerization of the functional monomer with conventional polymer monomers can change the twisted crystal structure of the side chain of conventional polymer materials into an ordered crystal structure, thus improving the strength, toughness and barrier of the polymer materials. The mechanical properties of the new material increase by 0.3 to 3 times compared with original polymers, and the thermal stability increases by 20-60%.

The disclosure provides a functional monomer comprising a mother solution; an organic ester; an additive agent and deionized water; and the mother solution comprises a rare earth compound or a metal compound, an organic acid, an organic amine, and deionized water.

The rare earth compound or the metal compound is an oxide, a hydroxide, or a carbonate of a rare earth or a metal, or a mixture thereof. The oxide is a suboxide.

The rare earth is lanthanum, cerium, europium, terbium or neodymium; the metal is zinc, calcium, magnesium, manganese, copper, nickel, aluminum, niobium, molybdenum, ruthenium, tungsten, rhenium or hafnium.

The organic acid is citric acid, maleic acid, ethylenediaminetetraacetic acid (EDTA), succinic acid, adipic acid, or a mixture thereof.

The organic amine is diethylamine, ethylenediamine, allylamine and diethylenetriamine, or a mixture thereof.

The mother solution comprises, by weight, 6-9% of the rare earth compound or the metal compound, 15-25% of the organic acid, 10-20% of the organic amine and the deionized water as the balance.

The organic ester is an acrylate or epoxy ester.

The acrylate is ethyl acrylate, butyl acrylate, isooctyl acrylate, or a mixture thereof; the epoxy ester is epoxy fatty acid methyl ester, epoxy acrylate, or a mixture thereof.

The additive agent comprises a catalyst and a polymerization inhibitor.

The catalyst is p-toluene sulfonic acid (PTSA), and the polymerization inhibitor is hydroquinone, toluhydroquinone (THQ), hydroquinone monomethyl ether (HQMME), 4-methoxyphenol (MEHQ), or a mixture thereof.

The functional monomer comprises, by weight, 18-28% of the mother solution; 48-58% of the organic ester; 0.1-2% of the additive agent, and the deionized water as the balance.

The disclosure also provides a method of preparing a functional monomer, the method comprising:

1) heating deionized water to a temperature of 50-60° C., holding the temperature; adding an organic acid to the deionized water, allowing to dissolve, followed by addition of a rare earth compound or a metal compound, 2-4 hours later, adding an organic amine, heating to a temperature of 70-80° C. and holding; cooling and filtering to yield a mother solution;

2) mixing the mother solution, deionized water, and a catalyst; vacuumizing a resulting mixture, heating the mixture to a temperature of 95-125° C. and holding, following by addition of a polymerization inhibitor and an organic ester; 2-4 hours later, cooling, standing, separating, thereby yielding a functional monomer.

Further provided is a method for preparing an alloy material, the method comprising polymerizing the functional monomer with a polymer monomer. Specifically, the functional monomer polymerizes with a polymer monomer to yield an alloy material, for example, an alloy material of polymer materials such as ABS, PE, PP, PA, polyimide, epoxy and metal/rare earth. The alloy material is obtained by emulsion polymerization and suspension polymerization, and may be an emulsion alloy material with a solid content of 50-60% or a 100% solid alloy material.

The solid alloy material is applied to fresh-keeping film, flexible packaging for food, fermented liquid food packaging bottle, medicine bottle or cosmetic bottle.

The emulsion alloy material is applied to the food packaging K film to improve the barrier property, yellowing resistance, heat sealing strength, oil resistance and water resistance of the K film.

When the alloy material is applied to the heavy-duty anti-corrosion water wash coating for steel structure, the VOC content can be controlled below 30 g/L, which is conducive to environmental protection.

The alloy material is applied to special and intelligent coatings, thus effectively preventing the adhesion of marine organisms and achieving stealth function.

The polymer monomer is vinylidene chloride.

The disclosure also provides a copolymerized alloy emulsion, comprising, by weight, 0.3-1% of a functional monomer;
0.2-4.5% of acrylic acid/methacrylic acid;
1-5% of isooctyl acrylate;
2-3% of butyl acrylate or trifluoroethyl methacrylate;
1-2% of methyl methacrylate;
1-2% of acrylonitrile;
35-55% of vinylidene chloride;
1-2% of acrylic phosphate;
1-2% of glycidyl acrylate;
10-25% of an emulsifying agent;
10-20% of a first base material comprising seed emulsion;
4-10% of an initiator; and
5-10% of a stabilizer.

The emulsifying agent comprises an emulsifier, a wetting agent, a protective adhesive and deionized water.

The emulsifying agent comprises, by weight (based on the total weight of the alloy emulsion), 12-18% of an emulsifier, 0.2-0.35% of a wetting agent, 0.2-0.35% of a protective adhesive, and 4-6% of deionized water.

The first base material comprises the seed emulsifier, an emulsifier, a wetting agent, a protective adhesive, a pH regulator and deionized water.

The first base material comprises, by weight (based on the total weight of the alloy emulsion), 12-18% of deionized water, 0.025-0.035% of an emulsifier, 0.025-0.035% of a wetting agent, 0.43-0.53% of a protective adhesive, 0.10-0.20% of a pH regulator, and 4-10% of the seed emulsion.

The emulsifier is a non-ionic fatty acid polyoxyethylene ether.

The wetting agent is a fluorine-containing anionic surfactant or a silicon containing anionic surfactant.

The protective adhesive is a phosphate anionic surfactant or a sulfonate anionic surfactant.

The pH regulator is ammonium bicarbonate, glacial acetic acid, diammonium hydrogen phosphate, potassium dihydrogen phosphate, or a mixture thereof.

The seed emulsifier comprises, by weight:
0.3-1% of the functional monomer;
0.2-4.5% of acrylic acid/methacrylic acid;
1-5% of isooctyl acrylate;
2-3% of butyl acrylate or trifluoroethyl methacrylate;
1-2% of methyl methacrylate;
1-2% acrylonitrile;
35-55% of vinylidene chloride;
1-2% of acrylic phosphate;
1-2% of glycidyl acrylate;
16.4-24.7% of emulsifying agent;
12.45-18.80% of a second base material; and
6-10% of the initiator.

The initiator comprises an initiator A and an initiator B; the initiator A comprises an oxidant and deionized water, and the initiator B comprises a reducing agent and deionized water.

The oxidant is hydrogen peroxide, ammonium persulfate, potassium persulfate, or a mixture thereof.

The reducing agent is carved white powder, sodium bisulfite, sodium hydrogen phosphite, or a mixture thereof.

The stabilizer accounts for 4-6 wt. % of the alloy emulsifier.

The stabilizer comprises, by weight (based on the total weight of the alloy emulsion), 0.1-0.5% of an antioxidant, 0.3-0.6% of an antiager, and 4-5% of vinylidene chloride.

The antioxidant is BHT, 1010, TPP, or a mixture thereof.

The antiager is UV-531, UV-9, UV-P, antioxidant H, antioxidant MB, or a mixture thereof.

The disclosure further provides a method of preparing the copolymerized alloy emulsion, the method comprising:
1) mixing monomers in proportion, adding the emulsifying agent at 17±2.5° C. and holding for 30-60 min to obtain a pre-emulsified monomer mixture;
2) adding the first base material to a polyreactor, vacuumizing the polyreactor and stirring the first base material; setting a temperature of the polyreactor to be 50-55° C.; at 34-42° C., adding the pre-emulsified monomer mixture and the initiator to the polyreactor within 13-14 hours and calculating an addition amount of the pre-emulsified monomer mixture in every 5 min; one hour later after the pre-emulsified monomer mixture is completely added, adding a regulator to the polyreactor within 20-30 min and calculating an addition amount of the regulator in every 5 min; adding the initiator to the polyreactor within 17-18 hours and calculating an addition amount of the initiator in every 5 min; 1-2 hours later after the initiator is completely added, charging nitrogen to the polyreactor for 2-3 hours to remove unreacted monomers, cooling the polyreactor to ≤35° C., and filtering to yield the copolymerized alloy emulsion.

The disclosure also provides a use of the copolymerized alloy emulsion for waterborne heavy-duty anticorrosion of steel structure, food packaging or preservation of eggs, fruits and vegetables.

Further provided is a copolymerized alloy solid resin, comprising, by weight:
35-55% of a monomer mixture and a dispersant mixture;
6-9% of an initiator mixture;
1-2% of a terminator;
0.1-0.2% of a neutralizer;
0.1-0.2% of a defoamer; and
25-35% of deionized water;
the monomer mixture and the dispersant mixture comprises:
5-10% of a functional monomer;
1-5% of isooctyl acrylate;
1-2% acrylonitrile;
59-83% vinylidene chloride;
1-2% of acrylic phosphate; and
the balance being a dispersant, and a total mass percentage is 100%.

The dispersant mixture comprises, by weight, 0.1-0.2% of an emulsifier, 0.1-0.2% of a wetting agent, 0.1-2% of a dispersant, 1-3% of a pH regulator, 0.002-0.008% of a molecular weight regulator, and 8-16% of deionized water.

The dispersant is polyvinyl alcohol.

The pH regulator is ammonium bicarbonate or ammonia water.

The molecular weight regulator is β-mercapto ethanol.

The initiator mixture comprises, by weight, 0.1-0.3% of an emulsifier, 0.1-0.3% of a wetting agent, 15-20% of an initiator, the balance being the deionized water, and a total mass percentage is 100%.

The initiator is di-(2-ethylhexyl)peroxydicarbonate (EHP) or diisopropyl peroxydicarbonate (IPP).

The emulsifier is a non-ionic fatty acid polyoxyethylene ether.

The wetting agent is a fluorine-containing anionic surfactant or silicon-containing anionic surfactant.

The terminator is diethylhydroxylamine (DEHA).

The neutralizer is sodium hydroxide.

The defoamer is a silane compound, particularly a silicone defoamer.

Also provided is a method of preparing the copolymerized alloy solid resin, the method comprising:
1) adding vinylidene chloride and acrylic phosphate to a reactor in proportion, stirring, followed by addition of the functional monomer, isooctyl acrylate, and acrylonitrile; adding the dispersant mixture, to yield dispersed monomers; and
2) vacuumizing the reactor, charging nitrogen, adding heated deionized water to the reactor, adding the dispersed monomers and the initiator mixture, stirring for reaction, adding the terminator, the neutralizer, and the defoamer, cooling, and obtaining the copolymerized alloy solid resin.

The preparation method is detailed as follows:
1. The Pre-Dispersion of the Monomers
(1) Vinylidene chloride is added to a first reactor (No. 1 reactor), followed by addition of acrylic phosphate. The mixture is stirred at 200-300 rpm for 20-30 min, and then sealed for 12-24 hours for use.

(2) The monomer in the reactor is filtered and added to a second reactor (No. 2 reactor), followed by addition of the functional monomer, isooctyl acrylate, and acrylonitrile. The monomers mixture is stirred under 200-300 rpm for use.

(3) The dispersant mixture is added to a third reactor (No. 3 reactor), stirred at 400-500 rpm for 20-30 min, followed by addition of the monomers mixture in (2) at an average speed within 90 min, to yield dispersed monomers.

2. Emulsification of Initiator

The water, an emulsifier, and a wetting agent are added to a fourth reactor (No. 4 reactor), stirred at 400-500 rpm, followed by addition of an initiator at an average speed within 90 min, to yield a dispersant mixture.

3. Heating of Deionized Water

Deionized water is added to a fifth reactor (No. 5 reactor) and stirred continuously at 300-400 rpm. The standard temperature of polymerization is set at (50-55° C.)+0.2° C. The water is headed and held for use.

4. Terminator

50% of terminator and 50% of deionized water are added to a sixth reactor (No. 6 reactor) and stirred continuously at 300-400 rpm.

5. Neutralizer

35% of terminator and 65% of deionized water are added to a reactor and stirred continuously at 300-400 rpm.

6. Polyreactor (No. 7 Reactor): Three-Layer Impellers (1) The polyreactor is washed using deionized water.

(2) After the surface of the inner wall of the polyreactor is dry, an anti-adhesion agent shall be coated; one time of coating is valid for 3-5 times of polymerization.

(3) The inner wall of the polyreactor is heated to 65° C. and held for 40 min, and then cooled for use.

7. Recovery of Materials (No. 8 Reactor)

Operation process: suspension batch polymerization process (1) The No. 7 reactor is sealed, vacuumized and nitrogen charged for three times to wash the reactor, and the reactor vacuumized again to −0.080-0.100 megapascal.

(2) Deionized water accounting for 25-40 of the volume of the No. 7 reactor is added. The standard temperature of polymerization is set at (50-55° C.)+0.2° C. The water is stirred at 500-800 rpm and the temperature is maintained.

(3) When the temperature rises to a certain value, the emulsified monomers accounting for 35-55% of the volume of the No. 7 reactor are added.

(4) When the temperature rises to a certain value, the initiator accounting for 6-9% of the volume of the No. 7 reactor is added at an average speed within 4-6 hours.

(5) When the pressure decreases to ≤0.050 megapascal, the conversion rate of the resin is ≥85%, and the terminator accounting for 2% of the total volume of the No. 7 reactor is added. 5 minutes later, the discharge valve on the bottom of the No. 7 reactor is opened. The discharge valve is connected to the No. 8 reactor. The No. 8 reactor is vacuumized, and the materials then flow to the No. 8 reactor, and stirred at 500-800 rpm. The valve of the No. 7 reactor is closed, and then deionized water and the emulsified monomers are added again. The above operations are repeated.

(6) The No. 8 reactor is heated to 50-70° C., and the nitrogen valve and vacuum pump switch of the reactor are opened to discharge the unreacted monomers. The unreacted monomers are recycled and stored through a condenser and reused with the new monomer at the ratio of 1:10 in the next cycle (7) 1-3 hours later, 0.1-0.2% of the neutralizer is added to the No. 8 reactor until the pH value is 6-7. Thereafter, 0.1-0.2 wt. % (total weight of the materials) of the defoamer is dropwise added, stirred for 3-5 min until no foam produced. The reactor is cooled and the product is collected.

(8) The product is semi-dried by a centrifuge, washed using deionized water and rinse materials, dehydrated by a centrifuge, dried by a drier, to yield the alloy solid resin.

The disclosure also provides a use of the copolymerized alloy solid resin, for packaging bottles, packaging boxes, packaging bags thus preventing the use of preservatives or preservative films for food, fruits and vegetables or eggs in the field of medicine, cosmetics and food, thus achieving the fresh-keeping function under normal temperature.

The alloy copolymer of rare earth/metal compound and vinylidene chloride has better performance than PVDC.

(1) The thermal stability coefficient of PVDC is increased from 100-110° C. to 150° C. and 140° C., which is higher than the melting point of PVDC, thus solving the problem that the existing pure PVDC resin cannot be used for film formation and injection.

(2) The twisted crystal structure of the side chain of PVDC is changed into an ordered crystal structure, thus greatly improving the strength, toughness and barrier of PVDC.

(3) Using the method, PVDC can be used for fresh keeping film, flexible packaging for food, fermented liquid food packaging bottle, medicine bottle, cosmetics bottle, thus reducing and eliminating the use of food preservatives.

The copolymerization of the functional monomer with polymer monomers such as vinylidene chloride can change the twisted crystal structure of the side chain of some existing polymer materials into an ordered crystal structure, thus greatly improving the strength, toughness and barrier of the polymer materials. The mechanical properties of the new material increase by 0.3 to 3 times, the thermal stability increases by 20-60%, and the new material is endowed with memory. The preparation process is simple, the cost is low, with a good application prospect.

DETAILED DESCRIPTIONS

To further illustrate, embodiments detailing a functional monomer comprising a rare earth/metal compound and a preparation method and use thereof are described below. It should be noted that the following embodiments are intended to describe and not to limit the disclosure.

Example 1

The formula of the mother solution is as follows:

| | Name | | | |
|---|---|---|---|---|
| | Deionized water | Citric acid | Lanthanum carbonate | Diethylamine |
| Mass percentage | 61.20% | 21.70% | 6.3% | 10.80% |

The preparation method is as follows:

1) Deionized water was added to a flask, stirred, heated to 55° C. The temperature was held at 55±2° C. in the presence of a pH meter.

2) Citric acid was added and completely dissolved, and then lanthanum carbonate was added.

3) The temperature of the mixture was controlled at 55±2° C. for 2-4 hours.

4) The change of the pH of the mixture was observed. When the pH value was stable at 2.8-3.6, the viscosity of the liquid increased. When the liquid dried slightly, diethylamine was added immediately, and the mixture was heated to 75° C., and the temperature was held at 75±2° C. for two hours. Thereafter, the mixture was cooled, filter, to yield the mother solution.

Example 2

The formula of the mother solution is as follows

| | Name | | | |
|---|---|---|---|---|
| | Deionized water | Maleic acid | Cerium carbonate | Ethylenediamine |
| Mass percentage | 56.60% | 24.20% | 8.10% | 11.10% |

The preparation method is as follows:

1) Deionized water was added to a flask, stirred, heated to 55° C. The temperature was held at 55±2° C. in the presence of a pH meter.

2) Maleic acid was added and completely dissolved, and then cerium carbonate was added.

3) The temperature of the mixture was controlled at 55±2° C. for 2-4 hours.

4) The change of the pH of the mixture was observed. When the pH value was stable at 2.8-3.6, the viscosity of the liquid increased. When the liquid dried slightly, ethylenediamine was added immediately, and the mixture was heated to 75° C., and the temperature was held at 75±2° C. for two hours. Thereafter, the mixture was cooled, filter, to yield the mother solution.

Example 3

The formula of the mother solution is as follows

| | Name | | | | |
|---|---|---|---|---|---|
| | Deionized water | Ethylenediaminetetraacetic acid | Cerium carbonate | Lanthanum carbonate | Allylamine |
| Mass percentage | 57.30% | 18.50% | 2.80% | 5.30% | 16.10% |

The preparation method is as follows:

1) Deionized water was added to a flask, stirred, heated to 55° C. The temperature was held at 55±2° C. in the presence of a pH meter.

2) Ethylenediaminetetraacetic acid was added and completely dissolved, and then cerium carbonate and lanthanum carbonate were added.

3) The temperature of the mixture was controlled at 55±2° C. for 2-4 hours.

4) The change of the pH of the mixture was observed. When the pH value was stable at 2.8-3.6, the viscosity of the liquid increased. When the liquid dried slightly, allylamine was added immediately, and the mixture was heated to 75° C., and the temperature was held at 75±2° C. for two hours. Thereafter, the mixture was cooled, filter, to yield the mother solution.

Example 4

The formula of the mother solution is as follows

| | Name | | | | |
|---|---|---|---|---|---|
| | Deionized water | Succinic acid | Zinc oxide | Copper hydroxide | Diethylenetriamine |
| Mass percentage | 51.70% | 21.20% | 4.60% | 4.00% | 13.10% |

The preparation method is as follows:

1) Deionized water was added to a flask, stirred, heated to 55° C. The temperature was held at 55±2° C. in the presence of a pH meter.

2) Succinic acid was added and completely dissolved, and then zinc oxide and copper hydroxide were added.

3) The temperature of the mixture was controlled at 55±2° C. for 2-4 hours.

4) The change of the pH of the mixture was observed. When the pH value was stable at 2.8-3.6, the viscosity of the liquid increased. When the liquid dried slightly, diethylenetriamine was added immediately, and the mixture was heated to 75° C., and the temperature was held at 75±2° C. for two hours. Thereafter, the mixture was cooled, filter, to yield the mother solution.

Example 5

The formula of the mother solution is as follows

| | Name | | | | |
|---|---|---|---|---|---|
| | Deionized water | Adipic acid | Magnesium oxide | Manganese carbonate | Allylamine |
| Mass percentage | 54.70% | 22.20% | 5.10% | 2.30% | 15.70% |

The preparation method is as follows:

1) Deionized water was added to a flask, stirred, heated to 55° C. The temperature was held at 55±2° C. in the presence of a pH meter.

2) Adipic acid was added and completely dissolved, and then magnesium oxide and manganese carbonate were added.

3) The temperature of the mixture was controlled at 55±2° C. for 2-4 hours.

4) The change of the pH of the mixture was observed. When the pH value was stable at 2.8-3.6, the viscosity of the liquid increased. When the liquid dried slightly, allylamine was added immediately, and the mixture was heated to 75° C., and the temperature was held at 75±2° C. for two hours. Thereafter, the mixture was cooled, filter, to yield the mother solution.

Example 6

The formula of the mother solution is as follows

| | Name | | | | |
|---|---|---|---|---|---|
| | Deionized water | Citric acid | Calcium hydroxide | Manganese carbonate | Diethylamine |
| Mass percentage | 49.70% | 24.20% | 3.10% | 4.30% | 18.70% |

The preparation method is as follows:

1) Deionized water was added to a flask, stirred, heated to 55° C. The temperature was held at 55±2° C. in the presence of a pH meter.

2) Citric acid was added and completely dissolved, and then calcium hydroxide and manganese carbonate were added.

3) The temperature of the mixture was controlled at 55±2° C. for 2-4 hours.

4) The change of the pH of the mixture was observed. When the pH value was stable at 2.8-3.6, the viscosity of the liquid increased. When the liquid dried slightly, diethylamine was added immediately, and the mixture was heated to 75° C., and the temperature was held at 75±2° C. for two hours. Thereafter, the mixture was cooled, filter, to yield the mother solution.

Example 7

The formula of the functional monomer is as follows:

| | Name | | | | |
|---|---|---|---|---|---|
| | Deionized water | Mother solution in Example 1 | P-methyl-benzene-sulfonic acid | Hydroquinone | Ethyl acrylate |
| Mass percentage | 25.20% | 24.60% | 0.20% | 0.68% | 49.32% |

The preparation method of the functional monomer is as follows:

1) Deionized water, the mother solution and P-methylbenzenesulfonic acid were added to an autoclave. The autoclave was vacuumized and nitrogen charged thrice, and then was vacuumized again. The mixture was stirred, heated to 110° C. and maintained.

2) Hydroquinone and ethyl acrylate were mixed and dissolved completely.

The mixture was dropwise added to the autoclave when the temperature therein was 110° C. Specifically, 0.6-0.9% of the total weight of the mixture of hydroquinone and ethyl acrylate was added every 5 minutes in 10-15 hours. The temperature was held for 3 hours.

3) The mixture was cooled to below 50° C., thereby yielding a product.

4) The product was poured to an oil-water separator. 4 hours later, a superstratum was produced and collected, which was the functional monomer.

5) A drying agent accounting for 1-3 wt. % of the functional monomer was added to the functional monomer. 24 hours later, the mixture was filtered, and stored in a dark container at room temperature. The term of validity of the functional monomer was 12 months.

Example 8

The formula of the functional monomer is as follows:

| | Name | | | | |
|---|---|---|---|---|---|
| | Deionized water | Mother solution in Example 2 | P-methyl-benzene-sulfonic acid | THQ | Butyl acrylate |
| Mass percentage | 28.30% | 19.50% | 0.22% | 0.71% | 51.27% |

The preparation method of the functional monomer is as follows:

1) Deionized water, the mother solution and P-methylbenzenesulfonic acid were added to an autoclave. The autoclave was vacuumized and nitrogen charged thrice, and then was vacuumized again. The mixture was stirred, heated to 120° C. and maintained.

2) O-methylhydroquinone (THQ) and butyl acrylate were mixed and dissolved completely. The mixture was dropwise added to the autoclave when the temperature therein was 120° C. Specifically, 0.6-0.9% of the total weight of the mixture of o-methylhydroquinone (THQ) and butyl acrylate was added every 5 minutes in 10-15 hours. The temperature was held for 3 hours.

3) The mixture was cooled to below 50° C., thereby yielding a product.

4) The product was poured to an oil-water separator. 4 hours later, a superstratum was produced and collected, which was the functional monomer.

5) A drying agent accounting for 1-3 wt. % of the functional monomer was added to the functional monomer. 24 hours later, the mixture was filtered, and stored in a dark container at room temperature. The term of validity of the functional monomer was 12 months.

Example 9

The formula of the functional monomer is as follows:

| | Name | | | | |
|---|---|---|---|---|---|
| | Deionized water | Mother solution in Example 3 | P-methyl-benzene-sulfonic acid | HQMME | Isooctyl acrylate |
| Mass percentage | 22.60% | 27.20% | 0.25% | 0.75% | 49.20% |

The preparation method of the functional monomer is as follows:

1) Deionized water, the mother solution and P-methylbenzenesulfonic acid were added to an autoclave. The autoclave was vacuumized and nitrogen charged thrice, and then was vacuumized again. The mixture was stirred, heated to 105° C. and maintained.

2) Hydroquinone monomethyl ether (HQMME) and isooctyl acrylate were mixed and dissolved completely. The mixture was dropwise added to the autoclave when the temperature therein was 105° C. Specifically, 0.6-0.9% of the total weight of the mixture of hydroquinone monomethyl ether (HQMME) and isooctyl acrylate was added every 5 minutes in 10-15 hours. The temperature was held for 3 hours.

3) The mixture was cooled to below 50° C., thereby yielding a product.

4) The product was poured to an oil-water separator. 4 hours later, a superstratum was produced and collected, which was the functional monomer.

5) A drying agent accounting for 1-3 wt. % of the functional monomer was added to the functional monomer. 24 hours later, the mixture was filtered, and stored in a dark container at room temperature. The term of validity of the functional monomer was 12 months.

Example 10

The formula of the functional monomer is as follows:

| | Name | | | | |
|---|---|---|---|---|---|
| | Deionized water | Mother solution in Example 4 | P-methyl-benzene-sulfonic acid | MEHQ | EFAME |
| Mass percentage | 31.60% | 18.20% | 0.19% | 0.70% | 49.31% |

The preparation method of the functional monomer is as follows:

1) Deionized water, the mother solution and P-methyl-benzenesulfonic acid were added to an autoclave. The autoclave was vacuumized and nitrogen charged thrice, and then was vacuumized again. The mixture was stirred, heated to 105° C. and maintained.

2) 4-methoxyphenol (MEHQ) and epoxy fatty acid methyl ester (EFAME) were mixed and dissolved completely. The mixture was dropwise added to the autoclave when the temperature therein was 105° C. Specifically, 0.6-0.9% of the total weight of the mixture of -methoxyphenol (MEHQ) and epoxy fatty acid methyl ester (EFAME) was added every 5 minutes in 10-15 hours. The temperature was held for 3 hours.

3) The mixture was cooled to below 50° C., thereby yielding a product.

4) The product was poured to an oil-water separator. 4 hours later, a superstratum was produced and collected, which was the functional monomer.

5) A drying agent accounting for 1-3 wt. % of the functional monomer was added to the functional monomer. 24 hours later, the mixture was filtered, and stored in a dark container at room temperature. The term of validity of the functional monomer was 12 months.

Example 11

The formula of the functional monomer is as follows:

| | Name | | | | |
|---|---|---|---|---|---|
| | Deionized water | Mother solution in Example 5 | P-methyl-benzene-sulfonic acid | MEHQ | Dibutyl maleate |
| Mass percentage | 27.40% | 21.60% | 0.27% | 0.75% | 49.98% |

The preparation method of the functional monomer is as follows:

1) Deionized water, the mother solution and P-methyl-benzenesulfonic acid were added to an autoclave. The autoclave was vacuumized and nitrogen charged thrice, and then was vacuumized again. The mixture was stirred, heated to 95° C. and maintained.

2) 4-methoxyphenol (MEHQ) and dibutyl maleate were mixed and dissolved completely. The mixture was dropwise added to the autoclave when the temperature therein was 95° C. Specifically, 0.6-0.9% of the total weight of the mixture of 4-methoxyphenol (MEHQ) and dibutyl maleate was added every 5 minutes in 10-15 hours. The temperature was held for 3 hours.

3) The mixture was cooled to below 50° C., thereby yielding a product.

4) The product was poured to an oil-water separator. 4 hours later, a superstratum was produced and collected, which was the functional monomer.

5) A drying agent accounting for 1-3 wt. % of the functional monomer was added to the functional monomer. 24 hours later, the mixture was filtered, and stored in a dark container at room temperature. The term of validity of the functional monomer was 12 months.

Example 12

The functional monomers obtained in Examples 7-11 are respectively copolymerized with vinylidene chloride, thereby yield alloy materials, the parameters thereof being as follows:

| Term | Example 7 | Example 8 | Example 9 | Example 10 | Example 11 | Ordinary PVDC | Executive Standard |
|---|---|---|---|---|---|---|---|
| Tensile strength/ MPa, vertical/ horizontal | 104/123 | 123/147 | 136/164 | 143/180 | 169/213 | 65/82 | BB/0012-2008(5.6) |
| Elongation at break/%, vertical/ horizontal | 74/61 | 95/72 | 111/82 | 116/86 | 137/105 | 53/41 | |
| Tear resistance/ N, vertical/ horizontal | 0.36/0.36 | 0.45/0.42 | 0.51/0.53 | 0.57/0.58 | 0.64/0.61 | 0.24/0.22 | |
| Heat shrinkable rate/%, vertical/ horizontal | −5/−6 | −8/−8 | −12/−11 | −14/−14 | −18/−19 | −22/−21 | |
| Water vapor transmission rate/g/(m$^2$, 24 H) | 0.8 | 0.8 | 0.9 | 0.9 | 1.1 | 2.2 | |

-continued

| Term | Example 7 | Example 8 | Example 9 | Example 10 | Example 11 | Ordinary PVDC | Executive Standard |
|---|---|---|---|---|---|---|---|
| Oxygen permeability/cm³/(m²/24 h. 0.1 MPa) | 4.0 | 4.0 | 4.0 | 4.6 | 5.2 | 31.0 | |
| Thermal stability | 135° C. | 135° C. | 135° C. | 140° C. | 150° C. | 105° C. | ISO 182-1:1990 |

1. The film width was 20 mm, and the thickness was 42 m.

2. Ordinary PVDC has high brittleness and poor thermal stability, so it cannot be blown to form the film alone. It can only be combined with other polymer materials (PE, nylon) to form the film, with relatively poor experimental barrier.

3. The film materials in Examples 7-11 are formed by rare-earth elements and PVDC (REPVDC), so that the barriers are relatively high. Because the abbreviation of rare earth element in English is "Re" and "Re" has the meaning of retracing and remanufacturing in English, to distinguish the existing PVDC materials, the PVDC copolymerized with the rare earth/metal alloy is named REPVDC.

The formula of the mother solution is as follows:

| | Name | | | |
|---|---|---|---|---|
| | Deionized water | Citric acid | Lanthanum carbonate | Diethylamine |
| Mass percentage | 61.20% | 21.70% | 6.3% | 10.80% |

The formula of the functional monomer is as follows:

| | Name | | | | |
|---|---|---|---|---|---|
| | Deionized water | Mother solution | P-methyl-benzene-sulfonic acid | Hydro-quinone | Ethyl acrylate |
| Mass percentage | 25.20% | 24.60% | 0.20% | 0.68% | 49.32% |

The formula is only for example. In actual operation, the functional monomer can be prepared according to the actual demand.

Example 13

The formula of the seed emulsion of the copolymerized REPVDC alloy emulsion is described as follows.

The formula of the monomer mixture is as follows:

| | Name | | | | |
|---|---|---|---|---|---|
| | Functional monomer | Methacrylic acid | Isooctyl acrylate | Butyl acrylate | Methyl methacrylate |
| Percentage (%) | 0.32 | 0.52 | 1.10 | 2.40 | 1.20 |

-continued

| | Name | | | |
|---|---|---|---|---|
| | Acrylonitrile | Vinylidene chloride | Acrylic phosphate | Glycidyl acrylate |
| Percentage (%) | 1.40 | 44.84 | 1.20 | 1.40 |

The formula of the emulsifying agent:

| | Name | | | |
|---|---|---|---|---|
| | Deionized water | Non-ionic fatty acid polyoxyethylene ether | Fluorinated anionic surfactant | Phosphate ester based anionic surfactant |
| Percentage (%) | 15.00 | 0.31 | 0.25 | 4.30 |

The formula of the base material:

| | Name | | | | |
|---|---|---|---|---|---|
| | Deionized water | Non-ionic fatty acid polyoxyethylene ether | Fluorinated anionic surfactant | phosphate ester based anionic surfactant | Ammonium bicarbonate |
| Percentage (%) | 15.00 | 0.025 | 0.03 | 0.50 | 0.12 |

The formula of the initiator:

| | Name | | | |
|---|---|---|---|---|
| | Reagent A | | Reagent B | |
| | Hydrogen peroxide | Deionized water | Rongalite | Deionized water |
| Percentage (%) | 0.05 | 5.00 | 0.03 | 5.00 |

The preparation method of the seed emulsion is detailed as follows:

1) The monomer mixture was prepared according to the formula and added to a first reactor, stirred.

2) The emulsifying agent was prepared according to the formula and added to a second reactor. The reactor was sealed, vacuumized, and nitrogen charged thrice.

Thereafter, nitrogen was charged again to make the pressure gauge zero. The emulsifying agent was stirred and the temperature was at 17±2.5° C.

3) Turn on a metering pump, and the monomer mixture was dropwise added to the second reactor in about 90 minutes, and then stirred at 17±2.5° C. for 30 minutes to obtain the emulsified monomers.

4) The base material was added to a polyreactor according to the formula. The polyreactor was sealed, vacuumized, and nitrogen charged thrice. Thereafter, the polyreactor was vacuumized again to have a pressure of −0.09-0.080. The base material was stirred under 600-800 rpm. The setting temperature was 60° C.

5) When the temperature rose to 48° C., the initiator was added to the polyreactor, with an addition amount of 4.5-5% of the total weight of the initiator in every 5 min. The addition process was to be finished in 17 hours.

6) When the temperature rose to 52° C., the emulsified monomers obtained in 3) were added to the polyreactor, with an addition amount of 5.8-6.2% of the total weight of the emulsified monomers in every 5 min. The addition process was to be finished in 14 hours 7) The mixture was held at 60° C. for 3 hours, and then the temperature was set to be 55° C. until the emulsified monomers were completely added.

8) One hour later, the temperature was set to be 52° C. until the initiator was completely added.

9) One hour later, the temperature of the polyreactor was decreased.

10) When the temperature decreased to less than 35° C., the nitrogen valve and vacuum pump switch of the polyreactor were opened to discharge the unreacted monomers. 2 hours later, samples were taken from the sampling valve to analyze the concentration of the residual monomer until the samples meet the standard, and then the nitrogen valve and vacuum pump were closed.

11) The vent valve was opened to make the pressure in the polyreactor equal to the atmospheric pressure, and then the final product was collected.

The seed emulsion of the example has high transparency, high residue and good storage stability. The preparation process has high polymerization pressure and is easy to demulsify.

Example 14

The formula of the monomer mixture is as follows:

| | Name | | | |
|---|---|---|---|---|
| Functional monomer | Methacrylic acid | Isooctyl acrylate | Butyl acrylate | Methyl methacrylate |
| Percentage (%) | 0.42 | 0.46 | 1.40 | 2.10 | 1.50 |

| | Name | | | |
|---|---|---|---|---|
| Acrylonitrile | Vinylidene chloride | Acrylic phosphate | Glycidyl acrylate |
| Percentage (%) | 1.20 | 49.73 | 1.60 | 1.10 |

The formula of the emulsifying agent:

| | Name | | | |
|---|---|---|---|---|
| | Deionized water | Non-ionic fatty acid polyoxyethylene ether | Silicone anionic surfactant | Sulfonate based anionic surfactant |
| Percentage (%) | 13.00 | 0.35 | 0.35 | 4.00 |

The formula of the base material:

| | Name | | | | |
|---|---|---|---|---|---|
| | Deionized water | Non-ionic polyoxyethylene fatty acid ester | Silicone anionic surfactant | Sulfonate based anionic surfactant | Glacial acetic acid |
| Percentage (%) | 12.00 | 0.028 | 0.035 | 0.46 | 0.15 |

The formula of the initiator:

| | Name | | | |
|---|---|---|---|---|
| | Reagent A | | Reagent B | |
| | Ammonium persulfate | Deionized water | Sodium bisulfite | Deionized water |
| Percentage (%) | 0.07 | 5.00 | 0.05 | 5.00 |

The preparation method of the seed emulsion is detailed as follows:

1) The monomer mixture was prepared according to the formula and added to a first reactor, stirred.

2) The emulsifying agent was prepared according to the formula and added to a second reactor. The reactor was sealed, vacuumized, and nitrogen charged thrice.

Thereafter, nitrogen was charged again to make the pressure gauge zero. The emulsifying agent was stirred and the temperature was at 17±2.5° C.

3) Turn on a metering pump, and the monomer mixture was dropwise added to the second reactor in about 90 minutes, and then stirred at 17±2.5° C. for 30 minutes to obtain the emulsified monomers.

4) The base material was added to a polyreactor according to the formula. The polyreactor was sealed, vacuumized, and nitrogen charged thrice. Thereafter, the polyreactor was vacuumized again to have a pressure of −0.09-0.080. The base material was stirred under 600-800 rpm. The setting temperature was 55° C.

5) When the temperature rose to 43° C., the initiator was added to the polyreactor, with an addition amount of 4.5-5% of the total weight of the initiator in every 5 min. The addition process was to be finished in 17 hours.

6) When the temperature rose to 48° C., the emulsified monomers obtained in 3) were added to the polyreactor, with an addition amount of 5.8-6.2% of the total weight of the emulsified monomers in every 5 min. The addition process was to be finished in 14 hours 7) The mixture was held at 55° C. for 3 hours, and then the temperature was set to be 52° C. until the emulsified monomers were completely added.

8) One hour later, the temperature was set to be 50° C. until the initiator was completely added.

9) One hour later, the temperature of the polyreactor was decreased.

10) When the temperature decreased to less than 35° C., the nitrogen valve and vacuum pump switch of the polyreactor were opened to discharge the unreacted monomers. 2 hours later, samples were taken from the sampling valve to analyze the concentration of the residual monomer until the samples meet the standard, and then the nitrogen valve and vacuum pump were closed.

11) The vent valve was opened to make the pressure in the polyreactor equal to the atmospheric pressure, and then the final product was collected.

The seed emulsion of the example has high barrier (long time salt spray test), low residue and moderate storage stability. The preparation process has moderate polymerization pressure, low residual monomer and high emulsion recovery rate of 99.3%.

Example 15

The formula of the seed emulsion of the copolymerized REPVDC alloy emulsion is described as follows.

The formula of the monomer mixture is as follows:

| | Name | | | |
|---|---|---|---|---|
| | Functional monomer | Methacrylic acid | Isooctyl acrylate | Butyl acrylate | Methyl methacrylate |
| Percentage (%) | 0.38 | 3.50 | 4.20 | 3.00 | 1.80 |

| | Name | | | |
|---|---|---|---|---|
| | Acrylonitrile | Vinylidene chloride | Acrylic phosphate | Glycidyl acrylate |
| Percentage (%) | 1.40 | 36.78 | 1.20 | 1.50 |

The formula of the emulsifying agent:

| | Name | | | |
|---|---|---|---|---|
| | Deionized water | Non-ionic polyoxyethylene fatty acid ester | Silicone anionic surfactant | Sulfonate based anionic surfactant |
| Percentage (%) | 15.00 | 0.30 | 0.30 | 4.80 |

The formula of the base material:

| | Name | | | | |
|---|---|---|---|---|---|
| | Deionized water | Non-ionic polyoxyethylene fatty acid ester | Silicone anionic surfactant | Sulfonate based anionic surfactant | Diammonium phosphate |
| Percentage (%) | 15.00 | 0.031 | 0.035 | 0.50 | 0.11 |

The formula of the initiator:

| | Name | | | |
|---|---|---|---|---|
| | Reagent A | | Reagent B | |
| | Potassium persulfate | Deionized water | Sodium orthophosphite | Deionized water |
| Percentage (%) | 0.10 | 5.00 | 0.06 | 5.00 |

The preparation method of the seed emulsion is detailed as follows:

1) The monomer mixture was prepared according to the formula and added to a first reactor, stirred.

2) The emulsifying agent was prepared according to the formula and added to a second reactor. The reactor was sealed, vacuumized, and nitrogen charged thrice. Thereafter, nitrogen was charged again to make the pressure gauge zero. The emulsifying agent was stirred and the temperature was at 17±2.5° C.

3) Turn on a metering pump, and the monomer mixture was dropwise added to the second reactor in about 90 minutes, and then stirred at 17±2.5° C. for 30 minutes to obtain the emulsified monomers.

4) The base material was added to a polyreactor according to the formula. The polyreactor was sealed, vacuumized, and nitrogen charged thrice. Thereafter, the polyreactor was vacuumized again to have a pressure of −0.09-0.080. The base material was stirred under 600-800 rpm. The setting temperature was 55° C.

5) When the temperature rose to 48° C., the initiator was added to the polyreactor, with an addition amount of 4.5-5% of the total weight of the initiator in every 5 min. The addition process was to be finished in 17 hours.

6) When the temperature rose to 52° C., the emulsified monomers obtained in 3) were added to the polyreactor, with an addition amount of 5.8-6.2% of the total weight of the emulsified monomers in every 5 min. The addition process was to be finished in 14 hours 7) The mixture was held at 55° C. for 3 hours, and then the temperature was set to be 50° C. until the emulsified monomers were completely added.

8) One hour later, the temperature was set to be 48° C. until the initiator was completely added.

9) One hour later, the temperature of the polyreactor was decreased.

10) When the temperature decreased to less than 35° C., the nitrogen valve and vacuum pump switch of the polyreactor were opened to discharge the unreacted monomers. 2 hours later, samples were taken from the sampling valve to analyze the concentration of the residual monomer until the samples meet the standard, and then the nitrogen valve and vacuum pump were closed.

11) The vent valve was opened to make the pressure in the polyreactor equal to the atmospheric pressure, and then the final product was collected.

The seed emulsion of the example has high adhesive strength, high barrier than that of Example 2, no residue and moderate storage stability. The preparation process has moderate polymerization pressure, high emulsion recovery rate, and lower residual monomer than that of Example 2.

Example 16

The formula of the copolymerized REPVDC alloy emulsion is described as follows.

The formula of the monomer mixture is as follows:

| | Name | | | |
|---|---|---|---|---|
| Functional monomer | Methacrylic acid | Isooctyl acrylate | Butyl acrylate | Methyl methacrylate |
| Percentage (%) 0.43 | 0.20 | 2.10 | 2.80 | 1.60 |

| | Name | | |
|---|---|---|---|
| Acrylonitrile | Vinylidene chloride | Acrylic phosphate | Glycidyl acrylate |
| Percentage (%) 1.20 | 40.25 | 1.00 | 1.00 |

The formula of the emulsifying agent:

| | Name | | |
|---|---|---|---|
| Deionized water | Non-ionic fatty acid polyoxyethylene ether | Fluorinated anionic surfactant | phosphate ester based anionic surfactant |
| Percentage (%) 13.80 | 0.29 | 0.23 | 3.96 |

The formula of the base material:

| Name | Seed emulsion | Deionized water | Non-ionic fatty acid polyoxyethylene ether | Fluorinated anionic surfactant | phosphate ester based anionic surfactant | Ammonium bicarbonate |
|---|---|---|---|---|---|---|
| Percentage (%) | 8.2 | 13.00 | 0.023 | 0.027 | 0.46 | 0.11 |

The formula of the initiator:

| | Name | | |
|---|---|---|---|
| Reagent A | | Reagent B | |
| Hydrogen peroxide | Deionized water | Rongalite | Deionized water |
| Percentage (%) 0.046 | 4.60 | 0.0276 | 4.60 |

The formula of the stabilizer:

| | Name | |
|---|---|---|
| Antioxidant (BHT) | Antideteriorant (UV-531) | Vinylidene chloride (as a solvent) |
| Permillage (‰) 0.30 | 0.52 | 4.8 |

The preparation method of the seed emulsion is detailed as follows:

1) The monomer mixture was prepared according to the formula and added to a first reactor, stirred.

2) The emulsifying agent was prepared according to the formula and added to a second reactor. The reactor was sealed, vacuumized, and nitrogen charged thrice.

Thereafter, nitrogen was charged again to make the pressure gauge zero. The emulsifying agent was stirred and the temperature was at 17±2.5° C.

3) Turn on a metering pump, and the monomer mixture was dropwise added to the second reactor in about 90 minutes, and then stirred at 17±2.5° C. for 30 minutes to obtain the emulsified monomers.

4) The base material was added to a polyreactor according to the formula. The polyreactor was sealed, vacuumized, and nitrogen charged thrice. Thereafter, the polyreactor was vacuumized again to have a pressure of −0.09-0.080. The base material was stirred under 600-800 rpm. The setting temperature was 52° C.

5) When the temperature rose to 38° C., the initiator was added to the polyreactor, with an addition amount of 4.5-5%0 of the total weight of the initiator in every 5 min. The addition process was to be finished in 17 hours.

6) When the temperature rose to 42° C., the emulsified monomers obtained in 3) were added to the polyreactor, with an addition amount of 5.8-6.2% of the total weight of the emulsified monomers in every 5 min. The addition process was to be finished in 14 hours 7) The mixture was held at 52° C. until the emulsified monomers were completely added.

8) One hour later, the temperature was set to be 50° C.

9) When the temperature decreased to 50° C., the regulator was added to the polyreactor, with an addition amount of 15-17% of the total weight of the regulator in every 5 min. The addition process was to be finished in 25-35 minutes.

10) The mixture was held at 50° C. for 1 hour, and then the temperature of the polyreactor was decreased.

11) When the temperature decreased to less than 35° C., the nitrogen valve and vacuum pump switch of the polyreactor were opened to discharge the unreacted monomers. 2 hours later, samples were taken from the sampling valve to analyze the concentration of the residual monomer until the samples meet the standard, and then the nitrogen valve and vacuum pump were closed.

12) The vent valve was opened to make the pressure in the polyreactor equal to the atmospheric pressure, and then the final product was collected.

The seed emulsion of the example has a wide range of particle size, high barrier, good storage stability, low residual monomer and short time to discharge the unreacted monomers. The preparation process has moderate polymerization pressure.

Example 17

The formula of the copolymerized REPVDC alloy emulsion is described as follows.

The formula of the monomer mixture is as follows:

| | Name | | | |
|---|---|---|---|---|
| Functional monomer | Methacrylic acid | Isooctyl acrylate | Butyl acrylate | Methyl methacrylate |
| Percentage (%) 0.32 | 0.43 | 2.40 | 2.10 | 1.62 |

| Name | | | |
|---|---|---|---|
| Acrylonitrile | Vinylidene chloride | Acrylic phosphate | Glycidyl acrylate |
| Percentage (%) 1.50 | 46.10 | 1.51 | 1.00 |

The formula of the emulsifying agent:

| Name | | | |
|---|---|---|---|
| Deionized water | Non-ionic fatty acid polyoxyethylene ether | Silicone anionic surfactant | Sulfonate based anionic surfactant |
| Percentage (%) 11.22 | 0.33 | 0.33 | 3.76 |

The formula of the base material:

| Name | Seed emulsion | Deionized water | Non-ionic fatty acid polyoxyethylene ether | Silicone anionic surfactant | Sulfonate based anionic surfactant | Glacial acetic acid |
|---|---|---|---|---|---|---|
| Percentage (%) | 6.40 | 10.28 | 0.026 | 0.033 | 0.43 | 0.14 |

The formula of the initiator:

| Name | | | |
|---|---|---|---|
| Reagent A | | Reagent B | |
| Ammonium persulfate | Deionized water | Sodium bisulfite | Deionized water |
| Percentage (%) 0.065 | 4.70 | 0.047 | 4.70 |

The formula of the stabilizer:

| Name | | |
|---|---|---|
| Antioxidant (1010) | Antideteriorant (UV-P) | Vinylidene chloride (as a solvent) |
| Permillage (‰) 0.30 | 0.52 | 4.8 |

The preparation method of the seed emulsion is detailed as follows:

1) The monomer mixture was prepared according to the formula and added to a first reactor, stirred.

2) The emulsifying agent was prepared according to the formula and added to a second reactor. The reactor was sealed, vacuumized, and nitrogen charged thrice.

Thereafter, nitrogen was charged again to make the pressure gauge zero. The emulsifying agent was stirred and the temperature was at 17±2.5° C.

3) Turn on a metering pump, and the monomer mixture was dropwise added to the second reactor in about 90 minutes, and then stirred at 17±2.5° C. for 30 minutes to obtain the emulsified monomers.

4) The base material was added to a polyreactor according to the formula. The polyreactor was sealed, vacuumized, and nitrogen charged thrice. Thereafter, the polyreactor was vacuumized again to have a pressure of −0.09-0.080. The base material was stirred under 600-800 rpm. The setting temperature was 50° C.

5) When the temperature rose to 36° C., the initiator was added to the polyreactor, with an addition amount of 4.5-5% of the total weight of the initiator in every 5 min. The addition process was to be finished in 17 hours.

6) When the temperature rose to 44° C., the emulsified monomers obtained in 3) were added to the polyreactor, with an addition amount of 5.8-6.2% of the total weight of the emulsified monomers in every 5 min. The addition process was to be finished in 14 hours 7) The mixture was held at 50° C. until the emulsified monomers were completely added.

8) One hour later, the temperature was set to be 48° C.

9) When the temperature decreased to 48° C., the regulator was added to the polyreactor, with an addition amount of 15-17% of the total weight of the regulator in every 5 min. The addition process was to be finished in 25-35 minutes.

10) The mixture was held at 48° C. for 1 hour, and then the temperature of the polyreactor was decreased.

11) When the temperature decreased to less than 35° C., the nitrogen valve and vacuum pump switch of the polyreactor were opened to discharge the unreacted monomers. 2 hours later, samples were taken from the sampling valve to analyze the concentration of the residual monomer until the samples meet the standard, and then the nitrogen valve and vacuum pump were closed.

12) The vent valve was opened to make the pressure in the polyreactor equal to the atmospheric pressure, and then the final product was collected.

The seed emulsion of the example has a moderate range of particle size, high barrier, good storage stability, low residual monomer and long time to discharge the unreacted monomers. The preparation process has moderate polymerization pressure.

Example 18

The formula of the copolymerized REPVDC alloy emulsion is described as follows.

The formula of the monomer mixture is as follows:

| | Name | | | |
|---|---|---|---|---|
| Functional monomer | Methacrylic acid | Isooctyl acrylate | Butyl acrylate | Methyl methacrylate |
| Percentage (%) 0.36 | 3.13 | 4.03 | 2.58 | 1.73 |

-continued

| | Name | | | |
|---|---|---|---|---|
| | Acrylonitrile | Vinylidene chloride | Acrylic phosphate | Glycidyl acrylate |
| Percentage (%) | 1.30 | 35.31 | 1.20 | 1.44 |

The formula of the emulsifying agent:

| | Name | | | |
|---|---|---|---|---|
| | Deionized water | Non-ionic fatty acid polyoxyethylene ether | Silicone anionic surfactant | Sulfonate based anionic surfactant |
| Percentage (%) | 14.40 | 0.28 | 0.28 | 4.61 |

The formula of the base material:

| Name | Seed emulsion | Deionized water | Non-ionic fatty acid polyoxyethylene ether | Silicone anionic surfactant | Sulfonate based anionic surfactant | Diammonium phosphate |
|---|---|---|---|---|---|---|
| Percentage (%) | 4.00 | 14.40 | 0.030 | 0.033 | 0.48 | 0.10 |

The formula of the initiator:

| | Name | | | |
|---|---|---|---|---|
| | Reagent A | | Reagent B | |
| | Potassium persulfate | Deionized water | Sodium orthophosphite | Deionized water |
| Percentage (%) | 0.096 | 4.80 | 0.058 | 4.80 |

The formula of the stabilizer:

| | Name | | |
|---|---|---|---|
| | Antioxidant (TPP) | Antideteriorant (MB) | Vinylidene chloride (as a solvent) |
| Permillage (‰) | 0.53 | 0.52 | 4.8 |

The preparation method of the seed emulsion is detailed as follows:

1) The monomer mixture was prepared according to the formula and added to a first reactor, stirred.

2) The emulsifying agent was prepared according to the formula and added to a second reactor. The reactor was sealed, vacuumized, and nitrogen charged thrice. Thereafter, nitrogen was charged again to make the pressure gauge zero. The emulsifying agent was stirred and the temperature was at 17±2.5° C.

3) Turn on a metering pump, and the monomer mixture was dropwise added to the second reactor in about 90 minutes, and then stirred at 17±2.5° C. for 30 minutes to obtain the emulsified monomers.

4) The base material was added to a polyreactor according to the formula. The polyreactor was sealed, vacuumized, and nitrogen charged thrice. Thereafter, the polyreactor was vacuumized again to have a pressure of −0.09-0.080. The base material was stirred under 600-800 rpm. The setting temperature was 48° C.

5) When the temperature rose to 34° C., the initiator was added to the polyreactor, with an addition amount of 4.5-5% of the total weight of the initiator in every 5 min. The addition process was to be finished in 17 hours.

6) When the temperature rose to 34° C., the emulsified monomers obtained in 3) were added to the polyreactor, with an addition amount of 5.8-6.2% of the total weight of the emulsified monomers in every 5 min. The addition process was to be finished in 14 hours 7) The mixture was held at 48° C. until the emulsified monomers were completely added.

8) One hour later, and the temperature was set to be 45° C.

9) When the temperature decreased to 45° C., the regulator was added to the polyreactor, with an addition amount of 15-17% of the total weight of the regulator in every 5 min. The addition process was to be finished in 25-35 minutes.

10) The mixture was held at 45° C. for 1 hour, and then the temperature of the polyreactor was decreased.

11) When the temperature decreased to less than 35° C., the nitrogen valve and vacuum pump switch of the polyreactor were opened to discharge the unreacted monomers. 2 hours later, samples were taken from the sampling valve to analyze the concentration of the residual monomer until the samples meet the standard, and then the nitrogen valve and vacuum pump were closed.

12) The vent valve was opened to make the pressure in the polyreactor equal to the atmospheric pressure, and then the final product was collected.

The seed emulsion of the example has a narrow range of particle size, good storage stability, high resistant to UV radiation, high residual monomer and long time to discharge the unreacted monomers. The preparation process has moderate polymerization pressure.

The performance of the emulsion in example 16-18 are as follows:

Examples 13, 14 and 15 provide seed emulsions, which are used as seeds to mix with the base material for the polymerization of alloy emulsion. The difference between the three seed emulsions is that the molecular weight is different, and the specific relationship is: 1<2<3; in the polymerization of the alloy emulsion, the seed emulsion can be selected according to the required molecular weight.

| Term | Example 16 | Example 17 | Example 18 | Executive Standard |
|---|---|---|---|---|
| Adhesive strength | ≥7 Mpa | ≥5 Mpa | ≥5 Mpa | GB/T5210-85 |
| Water vapor transmission rate/g/(m², 24 H) | 1.0 | 0.8 | 1.2 | BB/0012-2008(5.6) |

-continued

| Term | Example 16 | Example 17 | Example 18 | Executive Standard |
|---|---|---|---|---|
| Oxygen permeability/ cm$^3$/(m$^2$/24 h · 0.1 MPa) | 6.0 | 4.0 | 9.0 | |
| Resistant to UV radiation | >200 H | >200 H | >500 H | ISO 11507-2007 |
| Note | Suitable for waterborne anticorrosive primer of steel structure; PVDC film without primer | Suitable for waterborne anticorrosive intermediate coating of steel structure; primer coated PVDC film | Suitable for waterborne anticorrosive surface coating of steel structure; primer coated PVDC film with boiling resistance | |

Example 19

The formula of the copolymerized REPVDC alloy solid emulsion is described as follows.

The formula of the monomer mixture:

| | | | Name | | |
|---|---|---|---|---|---|
| | Functional monomer | Isooctyl acrylate | Acrylonitrile | Vinylidene chloride | Acrylic phosphate |
| Percentage (%) | 6.60 | 4.20 | 1.40 | 73.23 | 1.80 |

The formula of the dispersant mixture:

| Name | Deionized water | Non-ionic fatty acid polyoxyethylene ether | Fluorinated anionic surfactant | Polyvinyl alcohol | Ammonium bicarbonate | β-Mercaptoethanol |
|---|---|---|---|---|---|---|
| Percentage (%) | 11.50 | 0.16 | 0.10 | 1.10 | 1.30 | 0.004% |

The formula of the initiator mixture:

| Name | Deionized water | Non-ionic fatty acid polyoxyethylene ether | Fluorinated anionic surfactant | Di-2-ethylhexyl percarbonate (EHP) |
|---|---|---|---|---|
| Percentage (%) | 81.36 | 0.24 | 0.20 | 18.20 |

The formula of the terminator:

| Name | Deionized water | Diethylhydroxylamine (DEHA) |
|---|---|---|
| Percentage (%) | 50 | 50 |

The formula of the neutralizer:

| Name | Deionized water | Sodium hydroxide |
|---|---|---|
| Percentage (%) | 65 | 35 |

The formula of the defoamer:

| Name | Deionized water | Silane |
|---|---|---|
| Percentage (%) | 65 | 35 |

The balance was water.

The method of preparing the copolymerized REPVDC alloy solid resin is described as follows:

1) A No. 7 reactor was sealed, vacuumized and nitrogen was charged thrice to wash the reactor. The reactor was vacuumized again to −0.080-0.100 megapascal.

2) Hot deionized water was added to the reactor where the water accounted for 30% of the total volume of the reactor. The reaction standard temperature was set at 60±−0.2° C. The deionized water was stirred at 500-800 rpm at a constant temperature.

3) When the temperature rose to 50° C., the emulsified monomers were added to the reactor where the emulsified monomers accounted for 50% of the total volume of the reactor.

4) When the temperature rose to 55° C., the initiator mixture was added to the reactor where the initiator mixture accounted for 7% of the total volume of the reactor. The addition process was performed at the average speed within 4-6 hours.

5) When the pressure decreased to ≤0.050 megapascal, the conversion rate of REPVDC resin was ≥85%, and the terminator accounting for 2% of the total volume of the reactor was added. 5 minutes later, the discharge valve on the bottom of No. 7 reactor was opened. The discharge valve was connected to a No. 8 reactor. The No. 8 reactor was vacuumized, and the materials then flowed to the No. 8 reactor, and stirred at 500-800 rpm. The valve of the No. 7 reactor was closed, and then 30% of deionized water and 50% of emulsified monomers were added. The above operations were repeated.

6) The No. 8 reactor was heated to 60° C., the nitrogen valve and vacuum pump switch of the reactor were opened to discharge the unreacted monomers. The unreacted monomers were recycled and stored through a condenser and reused with the new monomer at the ratio of 1:10 in the next cycle.

7) 1-3 hours later, 0.13 wt. % of the neutralizer was added to the No. 8 reactor until the pH value was 6-7. Thereafter, 0.1 wt. % (total weight of the materials) of the defoamer was dropwise added, stirred for 3-5 min until no foam produced. The reactor was cooled and the product was collected.

8) The product was semi-dried by a centrifuge, washed using deionized water and rinse materials, dehydrated by a centrifuge, dried by a drier, to yield the REPVDC alloy solid resin.

The prepared REPVDC alloy solid resin has good barrier, general strength, suitable for injection molding of thin, less stressed packaging containers. The molecular weight of the resin obtained by the preparation process is small.

Example 20

The formula of the copolymerized REPVDC alloy solid emulsion is described as follows.

The formula of the monomer mixture:

| Name | Functional monomer | Isooctyl acrylate | Acrylonitrile | Vinylidene chloride | Acrylic phosphate |
| --- | --- | --- | --- | --- | --- |
| Percentage (%) | 8.20 | 4.80 | 2.00 | 65.74 | 1.80 |

The formula of the dispersant mixture:

| Name | Deionized water | Non-ionic fatty acid polyoxyethylene ether | Silicone anionic surfactant | Polyvinyl alcohol | Ammonia | β-Mercapto-ethanol |
| --- | --- | --- | --- | --- | --- | --- |
| Percentage (%) | 14.70 | 0.12 | 0.10 | 1.43 | 1.10 | 0.006% |

The formula of the initiator mixture:

| Name | Deionized water | Non-ionic fatty acid polyoxyethylene ether | Silicone anionic surfactant | Diisopropyl perdicarbonate (IPP) |
| --- | --- | --- | --- | --- |
| Percentage (%) | 82.06 | 0.24 | 0.20 | 17.5 |

The formula of the terminator:

| Name | Deionized water | Diethylhydroxylamine (DEHA) |
| --- | --- | --- |
| Percentage (%) | 50 | 50 |

The formula of the neutralizer:

| Name | Deionized water | Sodium hydroxide |
| --- | --- | --- |
| Percentage (%) | 65 | 35 |

The formula of the defoamer:

| Name | Deionized water | Silane |
| --- | --- | --- |
| Percentage (%) | 65 | 35 |

The balance was water.

The method of preparing the copolymerized REPVDC alloy solid resin is described as follows:

1) A No. 7 reactor was sealed, vacuumized and nitrogen was charged thrice to wash the reactor. The reactor was vacuumized again to −0.080-0.100 megapascal.

2) Hot deionized water was added to the reactor where the water accounted for 30% of the total volume of the reactor. The reaction standard temperature was set at 55±0.2° C. The deionized water was stirred at 500-800 rpm at a constant temperature.

3) When the temperature rose to 45° C., the emulsified monomers were added to the reactor where the emulsified monomers accounted for 50% of the total volume of the reactor.

4) When the temperature rose to 50° C., the initiator mixture was added to the reactor where the initiator mixture accounted for 7% of the total volume of the reactor. The addition process was performed at the average speed within 4-6 hours.

5) When the pressure decreased to ≤0.050 megapascal, the conversion rate of REPVDC resin was ≥85%, and the terminator accounting for 2% of the total volume of the reactor was added. 5 minutes later, the discharge valve on the bottom of No. 7 reactor was opened. The discharge valve was connected to a No. 8 reactor. The No. 8 reactor was vacuumized, and the materials then flowed to the No. 8 reactor, and stirred at 500-800 rpm. The valve of the No. 7 reactor was closed, and then 30% of deionized water and 50% of emulsified monomers were added. The above operations were repeated.

6) The No. 8 reactor was heated to 60° C., the nitrogen valve and vacuum pump switch of the reactor were opened to discharge the unreacted monomers. The unreacted monomers were recycled and stored through a condenser and reused with the new monomer at the ratio of 1:10 in the next cycle.

7) 1-3 hours later, 0.13 wt. % of the neutralizer was added to the No. 8 reactor until the pH value was 6-7. Thereafter, 0.1 wt. % (total weight of the materials) of the defoamer was dropwise added, stirred for 3-5 min until no foam produced. The reactor was cooled and the product was collected.

8) The product was semi-dried by a centrifuge, washed using deionized water and rinse materials, dehydrated by a centrifuge, dried by a drier, to yield the REPVDC alloy solid resin.

The prepared REPVDC alloy solid resin has good barrier, general strength, suitable for injection molding of thin, more stressed packaging containers. The molecular weight of the resin obtained by the preparation process is moderate.

Example 21

The formula of the copolymerized REPVDC alloy solid emulsion is described as follows.
The formula of the monomer mixture:

| Name | Functional monomer | Isooctyl acrylate | Acrylonitrile | Vinylidene chloride | Acrylic phosphate |
|---|---|---|---|---|---|
| Percentage (%) | 10.00 | 5.00 | 2.00 | 63.51 | 1.41 |

The formula of the dispersant mixture:

| Name | Deionized water | Non-ionic fatty acid polyoxyethylene ether | Fluorinate anionic surfactant | Polyvinyl alcohol | Ammonium bicarbonate | β-Mercapto-ethanol |
|---|---|---|---|---|---|---|
| Percentage (%) | 16.00 | 0.15 | 0.12 | 0.80 | 1.00 | 0.008% |

The formula of the initiator mixture:

| Name | Deionized water | Non-ionic fatty acid polyoxyethylene ether | Fluorinated anionic surfactant | Di-2-ethylhexyl percarbonate (EHP) |
|---|---|---|---|---|
| Percentage (%) | 84.06 | 0.24 | 0.20 | 15.5 |

The formula of the terminator:

| Name | Deionized water | Diethylhydroxylamine (DEHA) |
|---|---|---|
| Percentage (%) | 50 | 50 |

The formula of the neutralizer:

| Name | Deionized water | Sodium hydroxide |
|---|---|---|
| Percentage (%) | 65 | 35 |

The formula of the defoamer:

| Name | Deionized water | Silane |
|---|---|---|
| Percentage (%) | 65 | 35 |

The balance was water.
The method of preparing the copolymerized REPVDC alloy solid resin is described as follows:

1) A No. 7 reactor was sealed, vacuumized and nitrogen was charged thrice to wash the reactor. The reactor was vacuumized again to −0.080-0.100 megapascal.

2) Hot deionized water was added to the reactor where the water accounted for 30% of the total volume of the reactor. The reaction standard temperature was set at 50±0.2° C. The deionized water was stirred at 500-800 rpm at a constant temperature.

3) When the temperature rose to 40° C., the emulsified monomers were added to the reactor where the emulsified monomers accounted for 50% of the total volume of the reactor.

4) When the temperature rose to 45° C., the initiator mixture was added to the reactor where the initiator mixture accounted for 7% of the total volume of the reactor. The addition process was performed at the average speed within 4-6 hours.

5) When the pressure decreased to ≤0.050 megapascal, the conversion rate of REPVDC resin was ≥85%, and the terminator accounting for 2% of the total volume of the reactor was added. 5 minutes later, the discharge valve on the bottom of No. 7 reactor was opened. The discharge valve was connected to a No. 8 reactor. The No. 8 reactor was vacuumized, and the materials then flowed to the No. 8 reactor, and stirred at 500-800 rpm. The valve of the No. 7 reactor was closed, and then 30% of deionized water and 50% of emulsified monomers were added. The above operations were repeated.

6) The No. 8 reactor was heated to 60° C., the nitrogen valve and vacuum pump switch of the reactor were opened to discharge the unreacted monomers. The unreacted monomers were recycled and stored through a condenser and reused with the new monomer at the ratio of 1:10 in the next cycle.

7) 1-3 hours later, 1.5 wt. % of the neutralizer was added to the No. 8 reactor until the pH value was 6-7. Thereafter, 0.1 wt. % (total weight of the materials) of the defoamer was dropwise added, stirred for 3-5 min until no foam produced. The reactor was cooled and the product was collected.

8) The product was semi-dried by a centrifuge, washed using deionized water and rinse materials, dehydrated by a centrifuge, dried by a drier, to yield the REPVDC alloy solid resin.

The prepared REPVDC alloy solid resin has good barrier, general strength, suitable for blown film formation. The molecular weight of the resin obtained by the preparation process is large.

The REPVDC alloy solid resins obtained in Examples 19-21 have the parameters as follows:

| Term | Example 19 | Example 20 | Example 21 | Executive Standard |
|---|---|---|---|---|
| Tensile strength/MPa, vertical/horizontal | 156/178 | 172/220 | 190/252 | BB/0012-2008 (5.6) |
| Elongation at break/%, vertical/horizontal | 151/110 | 189/136 | 256/184 | |
| Tear resistance/N, vertical/horizontal | 1.02/1.06 | 1.34/1.29 | 1.67/1.53 | |
| Heat shrinkable rate/%, vertical/horizontal | −15/−14 | −18/−19 | −22/−20 | |
| Water vapor transmission rate/g/(m$^2$, 24 H) | 0.4 | 0.5 | 0.8 | |
| Oxygen permeability/ cm$^3$/(m$^2$ 24 h · 0.1 MPa) | 4.1 | 4.7 | 5.4 | |

| Term | Example 19 | Example 20 | Example 21 | Executive Standard |
|---|---|---|---|---|
| Thermal stability | 150° C. | 150° C. | 150° C. | ISO 182-1: 1990 |

It will be obvious to those skilled in the art that changes and modifications may be made, and therefore, the aim in the appended claims is to cover all such changes and modifications.

What is claimed is:

1. A composition of matter, comprising:
   1) a mother solution;
   2) an organic ester;
   3) an additive agent; and
   4) deionized water;
   wherein:
   the mother solution comprises a metal compound, an organic acid, an organic amine and deionized water;
   the metal compound is an oxide, a hydroxide, or a carbonate of a metal, or a mixture thereof;
   the organic acid is citric acid, maleic acid, ethylenediaminetetraacetic acid (EDTA), succinic acid, adipic acid, or a mixture thereof;
   the organic amine is diethylamine, ethylenediamine, allylamine and diethylenetriamine, or a mixture thereof; and
   the organic ester is an acrylate or epoxy ester; the acrylate is ethyl acrylate, butyl acrylate, isooctyl acrylate, or a mixture thereof; the epoxy ester is epoxy fatty acid methyl ester, epoxy acrylate, or a mixture thereof.

2. The composition of matter of claim 1, wherein the metal is lanthanum, cerium, europium, terbium, neodymium, zinc, calcium, magnesium, manganese, copper, nickel, aluminum, niobium, molybdenum, ruthenium, tungsten, rhenium, or hafnium.

3. The composition of matter of claim 1, wherein the additive agent comprises a catalyst and a polymerization inhibitor; the catalyst is p-toluene sulfonic acid (PTSA), and the polymerization inhibitor is hydroquinone, toluhydroquinone (THQ), hydroquinone monomethyl ether (HQMME), 4-methoxyphenol (MEHQ), or a mixture thereof.

4. The composition of matter of claim 1, comprising, by weight, 18-28% of the mother solution; 48-58% of the organic ester; 0.1-2% of the additive agent, and the deionized water as the balance.

5. A method of preparing a composition of matter, the method comprising:
   1) heating deionized water to a temperature of 50-60° C., holding the temperature for 2-4 hours; adding an organic acid to the deionized water, allowing to dissolve, followed by addition of a metal compound, 2-4 hours later, adding an organic amine, heating to a temperature of 70-80° C. and holding; cooling to approximately 25° C. and filtering to yield a mother solution;
   2) mixing the mother solution, deionized water, and a catalyst in a reactor; vacuumizing the reactor, heating the reactor to a temperature of 95-125° C. and holding, following by addition of a polymerization inhibitor and an organic ester; 2-4 hours later, cooling the reactor, allowing to stand, separating a resulting product, thereby yielding a composition of matter.

6. A method for preparing an alloy material, the method comprising polymerizing the composition of matter of claim 1 with a polymer monomer.

7. A copolymerized alloy emulsion, comprising, by weight:
   0.3-1% of the composition of matter of claim 1;
   0.2-4.5% of acrylic acid/methacrylic acid;
   1-5% of isooctyl acrylate;
   2-3% of butyl acrylate or trifluoroethyl methacrylate;
   1-2% of methyl methacrylate;
   1-2% of acrylonitrile;
   35-55% of vinylidene chloride;
   1-2% of acrylic phosphate;
   1-2% of glycidyl acrylate;
   10-25% of an emulsifying agent;
   10-20% of a first base material comprising seed emulsion;
   4-10% of an initiator; and
   5-10‰ of a stabilizer.

8. The copolymerized alloy emulsion of claim 7, wherein the emulsifying agent comprises, by weight, 12-18% of an emulsifier, 0.2-0.35% of a wetting agent, 0.2-0.35% of a protective adhesive and 4-6% of deionized water.

9. The copolymerized alloy emulsion of claim 8, wherein the first base material comprises, by weight, 12-18% of deionized water, 0.025-0.035% of an emulsifier, 0.025-0.035% of a wetting agent, 0.43-0.53% of a protective adhesive, 0.10-0.20% of a pH regulator, and 4-10% of the seed emulsion.

10. The copolymerized alloy emulsion of claim 9, wherein the emulsifier is a non-ionic fatty acid polyoxyethylene ether; the wetting agent is a fluorine-containing anionic surfactant or a silicon containing anionic surfactant; the protective adhesive is a phosphate anionic surfactant or a sulfonate anionic surfactant.

11. The copolymerized alloy emulsion of claim 9, wherein the seed emulsifier comprises, by weight:
   0.3-1% of the functional monomer of a metal compound;
   0.2-4.5% of acrylic acid/methacrylic acid;
   1-5% of isooctyl acrylate;
   2-3% of butyl acrylate or trifluoroethyl methacrylate;
   1-2% of methyl methacrylate;
   1-2% acrylonitrile;
   35-55% of vinylidene chloride;
   1-2% of acrylic phosphate;
   1-2% of glycidyl acrylate;
   16.4-24.7% of emulsifying agent;
   12.45-18.80% of a second base material; and
   6-10% of the initiator.

12. The copolymerized alloy emulsion of claim 11, wherein the initiator comprises an initiator A and an initiator B; the initiator A comprises an oxidant and deionized water, and the initiator B comprises a reducing agent and deionized water; the oxidant is hydrogen peroxide, ammonium persulfate, potassium persulfate, or a mixture thereof; the reducing agent is carved white powder, sodium bisulfite, sodium hydrogen phosphite, or a mixture thereof.

13. The copolymerized alloy emulsion of claim 7, wherein the stabilizer comprises, by weight, 0.1-0.5‰ of an antioxidant, 0.3-0.6‰ of an antiager, and 4-5‰ of vinylidene chloride; the antioxidant is BHT, 1010, TPP, or a mixture thereof; the antiager is UV-531, UV-9, UV-P, antioxidant H, antioxidant MB, or a mixture thereof.

14. A method of preparing the copolymerized alloy emulsion of claim 7, the method comprising:
   1) Mixing monomers in proportion, adding the emulsifying agent at 17±2.5° C. and holding for 30-60 min to obtain a pre-emulsified monomer mixture;

2) Adding the first base material to a polyreactor, vacuumizing the polyreactor and stirring the first base material; setting a temperature of the polyreactor to be 50-55° C.; when the temperature of the polyreactor is 34-42° C., adding the pre-emulsified monomer mixture and the initiator to the polyreactor within 13-14 hours and calculating an addition amount of the pre-emulsified monomer mixture in every 5 min; one hour later after the pre-emulsified monomer mixture is added, adding a regulator to the polyreactor within 20-30 min and calculating an addition amount of the regulator in every 5 min; adding the initiator to the polyreactor within 17-18 hours and calculating an addition amount of the initiator in every 5 min; 1-2 hours later after the initiator is added, charging nitrogen to the polyreactor for 2-3 hours to remove unreacted monomers, cooling the polyreactor to ≤35° C., and filtering using a steel mesh to yield the copolymerized alloy emulsion.

15. A copolymerized alloy solid resin, comprising, by weight:
   35-55% of a monomer mixture and a dispersant mixture;
   6-9% of an initiator mixture;
   1-2% of a terminator;
   0.1-0.2% of a neutralizer;
   0.1-0.2% of a defoamer; and
   25-35% of deionized water;
wherein the monomer mixture and the dispersant mixture comprises:
   5-10% of the composition of matter of claim 1;
   1-5% of isooctyl acrylate;
   1-2% acrylonitrile;
   59-83% vinylidene chloride;
   1-2% of acrylic phosphate; and
   a dispersant as the balance; and
   the terminator is diethylhydroxylamine (DEHA), the neutralizer is sodium hydroxide, and the defoamer is a silane compound.

16. The copolymerized alloy solid resin of claim 15, wherein the dispersant mixture comprises, by weight, 0.1-0.2% of an emulsifier, 0.1-0.2% of a wetting agent, 0.1-2% of a dispersant, 1-3% of a pH regulator, 0.002-0.008‰ of a molecular weight regulator, and 8-16% of deionized water; the dispersant is polyvinyl alcohol; the pH regulator is ammonium bicarbonate or ammonia water; and the molecular weight regulator is β-mercapto ethanol.

17. The copolymerized alloy solid resin of claim 16, wherein the initiator mixture comprises, by weight, 0.1-0.3% of an emulsifier, 0.1-0.3% of a wetting agent, 15-20% of an initiator, the balance being the deionized water, and a total mass percentage is 100%; the initiator is di-(2-ethylhexyl)peroxydicarbonate (EHP) or diisopropyl peroxydicarbonate (IPP).

18. The copolymerized alloy solid resin of claim 17, wherein the emulsifier is a non-ionic fatty acid polyoxyethylene ether; the wetting agent is a fluorine-containing anionic surfactant or silicon-containing anionic surfactant.

19. A method of preparing the copolymerized alloy solid resin of claim 15, the method comprising:
   1) Adding vinylidene chloride and acrylic phosphate to a reactor in proportion, stirring, followed by addition of the composition of matter, isooctyl acrylate, and acrylonitrile; adding the dispersant mixture, to yield dispersed monomers; and
   2) Vacuumizing the reactor, charging nitrogen to the reactor, adding heated deionized water to the reactor, adding the dispersed monomers and the initiator mixture, stirring, adding the terminator, the neutralizer, and the defoamer, cooling, and obtaining the copolymerized alloy solid resin.

20. A method of preparing a packaging bottle, a packaging box, a packaging bag or a preservative film for medicine, cosmetics or food, the method comprising melting, extruding, blowing or stretching the copolymerized alloy solid resin of claim 15.

* * * * *